United States Patent Office 2,853,394
Patented Sept. 23, 1958

2,853,394

CEMENTITIOUS COMPOSITION

Wallace C. Riddell, Berkeley, and George B. Kirk, Redwood City, Calif., assignors, by mesne assignments, to United States Gypsum Company, Chicago, Ill., a corporation of Illinois No Drawing. Application March 30, 1953
Serial No. 345,714

13 Claims. (Cl. 106—114)

This invention relates to a cementitious composition, more particularly to wallboard, lath or sheathing containing a cementitious gypsum core; and more especially to such products characterized by improved resistance to fire.

Wallboards, laths and the like, for both ceiling and wall installations, have long been known. It has also been observed in the past that when such products, made according to hitherto usual practices, are attacked by fire, or are subjected to standardized fire tests, the gypsum is calcined, losing more or less of its water of hydration, and the wallboards made thereof exhibit shrinkage cracks, or otherwise fail, and expose the frame of the building to the fire. Failure of ceiling boards has been a particular problem.

It is an object of this invention to make a dense gypsum wallboard which exhibits improved fire resistance. It is a further object to make a fire-resistant gypsum wallboard which exhibits high flexural strength. It is another object of this invention to provide a more economical and efficient method for making such gypsum wallboard. Other objects and advantages of the present invention will become evident from the description below.

According to the present invention it has now been found that a gypsum core wallboard of excellent strength and improved fire resistance is obtained by preparing a cementitious composition containing a set mass of interlaced gypsum crystals and, intimately admixed therewith, from 1% to 5% of expanded perlite and from 0.2% to 0.5% of vitreous ceramic, preferably glass, strands, on the dry basis. Where the term "dry basis" is employed herein, it is to be understood as dry, i. e. absence of free water, but not as calcined; which is to say that water of hydration, i. e. combined water, is present. In another mode of operation, it is especially advantageous to replace a portion, less than 50%, of the expanded perlite defined above by the admixture of an amount of raw or unexpanded vermiculite of particle size at least 90% passing a No. 50 screen or of less than 0.3 mm. diameter. In other words, there can be admixed from 0.5% to 2.5% of unexpanded vermiculite of the sizes shown, replacing a portion only of the expanded perlite. The total amount of both expanded perlite and unexpanded vermiculite added is from 1% to 5% of the total weight of dry mix. The cementitious composition can also contain small amounts, that is, from 0.25% to 0.50% of additives including dextrin or partially dextrinized farinaceous material, a dispersing agent such as waste sulfite liquor, a metal or ammonium salt of lignosulfonic acid, e. g. calcium lignone sulfonate, magnesium lignone sulfonate, sodium lignone sulfonate, or the like. It is also to be understood that small amounts of accelerators or of retarders, as well known in this art, can also be incorporated in the mix as will be seen also from the examples given, the cementitious composition or core consists essentially of calcined or set gypsum, in admixture with the expanded perlite (if desired, with a small amount of unexpanded vermiculite) and ceramic or glass fibers or strands, as defined in the claims; and, if desired, a retarder, adhesive, accelerator or dispersing agent or more than one of these additives, the latter materials being added in the manner known to the art.

The expanded perlite employed in the present process and product is obtained by heating raw perlite in the known manner to cause expansion of the water of the raw mineral and vesiculation of the rock. Suitable heating methods have been described in various patents and publications, whereby the perlite is puffed or vesiculated, and the contained water is not permitted to escape slowly so as to make a dried but dense product. A suitable apparatus and method for making expanded perlite useful herein is described in Zoradi, U. S. Patent No. 2,602,782, dated July 8, 1952. Other devices and methods can be employed, however. The expanded perlite is employed in the amounts described above, and has a bulk density of from 5 to 15 lbs. per cubic foot, preferably of from 7 to 12 lbs. per cubic foot. In making a wallboard of 5/8 inch thickness, which has an average core weight of about 2800 lbs. per 1000 square feet, there are employed from 2 to 12 cubic feet, preferably from 4 to 9 cubic feet, of the expanded perlite. This material is employed in particle sizes substantially entirely passing a No. 8 screen or less than 2.38 mm. diameter and substantially entirely retained on a No. 100 screen or of at least 149 microns diameter. Preferably, at least 50% of the particles are of a particle size between No. 16 screen or 1.19 mm. diameter and No. 50 screen or 300 microns diameter. The expanded perlite has been found to improve fire resistance very greatly and to enable the production of a dense wallboard, having high flexural strength.

The glass strands or fibers employed herein have an average diameter of from 0.00015 to 0.0006 inch, preferably 0.0003 to 0.0006 inch, and are from 0.5 to 3.0, preferably 0.5 to 1.0, inch in length. Where the gypsum core composition has an average weight of 2800 to 3000 lbs. per 1000 square feet, the glass strands are added in an amount of from 3 to 12 lbs. per 1000 square feet of board. The glass strands also improve both the strength and fire resistance of the board, and have the further advantage that they are readily incorporated in the gypsum slurry or mix.

The starting gypsum material employed herein is calcined gypsum, or calcium sulfate hemihydrate. It is made into a slurry with water in the usual manner and 0.25% to 0.50% of additives including adhesive, dispersing agent and retarder or accelerator are added with thorough mixing. The expanded perlite and the glass strands, as described above, can be added in the slurry so prepared and intimately mixed therewith. Alternatively, the expanded perlite or the glass strands, or both, can be thoroughly mixed with the dry calcined slurry and the whole then formed into a slurry with water. The slurry is deposited between two paper liners, formed into board and dried.

No foaming agent, such as soap, resin, rosin, resin salt or rosin salt, or substances which react in a gypsum slurry to form a gas such as carbon dioxide is added in this composition. The set cementitious product obtained is dense and of high weight, and is substantially free of foamed cells or artificially produced voids. The presence of such voids or cells is found to be highly undesirable in a fire-resistant wallboard. In order to produce a gypsum board having the desired fire resistance, cells are to be substantially prevented, except those which are inherently present as a result of normal calcining, mixing and forming operations. However, no foaming agent, such as saponaceous compounds or air-entraining substances or substances which react to form gases in the mass, are added in the cementitious mix.

Likewise, it has been found that the presence of organic fibrous materials is not desirable and, therefore, the addition of paper fiber, wood fiber, sawdust or the like is preferably avoided, and the composition of this invention is preferably substantially free of organic fibrous material. However, if it is desired to add a small amount of such fibrous material to improve resilience and flexibility of the board, the addition must not exceed 0.5%, based on the weight of the finished board.

The examples below will describe more clearly the mode of operation of the method of this invention, and also the products obtained thereby.

In preparing the mixes according to the present invention, a calcined gypsum slurry is made up with water according to good commercial practice as well known in this art. With the slurry is admixed a small amount of an adhesive, such as starch or dextrin, to ensure bonding of the paper liners to the core. There is also admixed a small amount of a dispersing agent such as waste sulfite liquor or the dried residue thereof, or a lignin compound as described above. There is also admixed, if necessary or desirable, the usual small amount of either a retarder, such as hydrolyzed or partially hydrolyzed keratin, or an accelerator, as may be desired either to decrease or to prolong the time of set of the particular gypsum employed. The foregoing additions are well known to those skilled in this art, and are made, as usual, in such small amounts, i. e. from 0.25% to 0.50% total of these ingredients, that, for the purposes of this invention, the calcined gypsum or the set gypsum can be considered as substantially entirely calcined or set gypsum. To the calcined gypsum slurry so prepared are added, with thorough mixing to produce a uniform interdispersion, the expanded perlite and the glass strands, as described more fully above. It is to be understood that the expanded perlite, or the glass strands, or both can be admixed with the gypsum material prior to addition of water, if desired. If the small amount of organic fibrous material permissible is to be added to improve flexibility, it can also be added to the dry mass or to the water slurry. The slurry is, after thorough mixing, deposited between paper liners in a forming device, in the well known manner, allowed to set, and is then dried, and cut into lengths as desired. Preferably, the mass is formed into boards ⅝ inch in thickness. The dried boards of the examples given herein are subjected to blow torch and to wall furnace and ceiling furnace tests to determine their fire resistance ratings.

In carrying out the blow torch test, a 12 inch x 12 inch test piece of the board in question is placed vertically in front of a standard gasoline blow torch with the torch flame impinging on the board surface. The temperature of the board surface at the point of impingement is maintained at 1650° F. The temperature on the unexposed side of the board is measured by a thermocouple fastened to the board and covered with an asbestos pad. The time required for the temperature on the unexposed surface to rise to 350° C. is taken as the blow torch rating. For the wall and ceiling tests, small scale furnaces were constructed according to A. S. T. M. Specification E–T, and the tests run as described in A. S. T. M. Specification E119–50. According to these specifications, there is provided a test panel of the gypsum core board to be examined, of at least 100 square feet area with a minimum dimension of 9 feet. The test furnace is made of firebrick or other suitable material with a front opening wherein either dimension is not less than six times the thickness of the panel to be tested. The furnace is equipped with gas-air or oil burners so arranged that the flame bathes the specimen rather than impinges on it and so that the temperatures along the exposed face are essentially uniform. The temperatures within the furnace and on the unexposed face of the test panel are measured by means of thermocouples. The panel is from 0.5 to 1 inch smaller than the furnace into which it is to be set and the spaces at the edges are packed with rock wool or other incombustible insulation but without restraining the edges in such manner as to prevent warpage or thermal curvature. The furnace fire is started after the panel is set in place and the temperature raised, according to the "Standard Time-Temperature curve" (A. S. T. M. E119–50): 1000° F. at 5 minutes, 1300° F. at 10 minutes, 1550° F. at 30 minutes, 1700° F. at one hour and 1850° F. at two hours. The time required to raise the average temperature on the unexposed face of the panel 250° F. above the initial temperature is taken, to the nearest minute, as the fire rating.

In the floor-ceiling tests, a panel is built by nailing the gypsum board to be tested to the lower edge of 2″ x 10″ floor joists, on top of which are applied successively 1″ x 6″ diagonal subflooring, a layer of building paper and then 1″ x 4″ flooring. The test flames bathe the face of the gypsum-core board. If the fire-resistance under load is to be determined, the panel is uniformly loaded as calculated to develop approximate working stresses, for example, in Underwriter Laboratories fire-resistant tests run on boards made according to this invention, in the floor-ceiling tests, the boards were placed under a loading approximating the working stresses of the framing materials used. The fire test rating in the floor-ceiling test made in an installation as described above is taken as the time required for the temperature on the exposed edges of the 1″ x 4″ flooring to increase 250° F. above the initial temperature.

*Example 1*

A calcined gypsum slurry in water is made up according to good commercial practice, there being added in the slurry 1.5 lbs. waste sulfite liquor, 0.7 lb. commercial retarder and 8 lbs. dextrin (or not over a total of about 0.4%, dry basis, of all of these additives). All weights in these examples are based on 1000 square feet of finished board (in this example, of ⅝ inch board). To the slurry prepared as described there are added 12 lbs. of glass strands 0.5 to 0.75 inch in length and of average diameter of 0.0005 inch, and 44 lbs. of expanded perlite weighing from 8 to 12 lbs. per cubic foot, and of particle size less than 2.38 mm. and more than 149 microns diameter, at least 50% being between 1.19 mm. and 0.30 mm. diameter. These additives amount to about 1.6% of expanded perlite, about 0.43% glass strands and the remainder substantially all gypsum, in the set core composition, containing no foamed cells or organic fibrous material. The mixed slurry is deposited between paper liners to form ⅝ inch board, and is allowed to set, and dried, all in the usual manner. The finished board has a wall furnace rating of 69 minutes in tests made at Underwriter Laboratories and a floor-ceiling furnace test of 61 minutes.

*Example 2*

A batch of wallboard is made up as described above, adding to the calcined gypsum slurry 7.3 cubic feet, per 1000 square feet of (⅝ inch) board, of expanded perlite weighing 9 lbs. per cubic foot and of the particle sizes described in Example 1, and 5.5 lbs. (per 1000 square feet of the board) of glass strands 0.5 inch in length and having a diameter of from 0.0003 to 0.0006 inch, with thorough mixing, the mix being formed into board as described above. No soap or organic fiber is added. The test rating in the wall furnace of this board is 63 minutes, and in the ceiling furnace, 60 minutes; and the blow torch test is 17.5 minutes. The dry weight of the finished board is 2850 lbs. per 1000 square feet and the compressive strength of the slurry at the mixer is 1175 p. s. i.

*Example 3*

Another batch of calcined gypsum slurry in water starting material is made up as in Example 1, i. e., containing calcined gypsum, waste sulfite liquor, commercial retarder and dextrin. To this starting material are added with thorough mixing 7.3 cubic feet of expanded perlite, weighing about 9 lbs. per cubic foot, and of the particle sizes described in Example 1, 0.25% of the glass fibers as described in Example 1, and 10 lbs. of sawdust. The whole is mixed and formed into boards as described in Example 1. The finished board exhibits a wall furnace rating of 63 minutes, tested in the wall furnace described hereinabove.

*Example 4*

Another batch of gypsum slurry in water is made up as in Example 1, and to this starting material there are added 4.2 cubic feet of expanded perlite as employed in Example 3, 4.2 lbs. (0.17%) of glass fibers as described in Example 1 and 42 lbs. of raw vermiculite ground to 90% passing a No. 50 sieve. The whole is mixed and formed into boards as in Example 1; and the wall furnace fire-resistance rating is found to be 60 minutes, and the blow torch test 16 minutes.

The addition of unexpanded vermiculite of particle size below 50 mesh as described ensures more uniform expansion of the vermiculite and satisfactory volume stability of the gypsum products. Test pieces ⅝" thick and 3½" on a side were cast in the laboratory from batches of a water slurry of calcined gypsum made as in Example 1, except that in Batch A no mineral aggregate was added; and in Batch B, 2% expanded perlite as described herein and 2% raw vermiculite of minus 50 mesh size were added. After drying, the test pieces were heated to 1400° F. for 30 minutes and the volume change was measured by determining changes in the linear measurements. The test pieces of calcined gypsum without aggregate contracted by 8% volume (Batch A); whereas the pieces containing both expanded perlite and raw vermiculite exhibited only 0.5% increase in volume. In similar tests but made with the addition of 10% of a mineral aggregate consisting only of minus 50 mesh vermiculite, there was a volume increase in the test pieces of 2%; and if larger sizes of vermiculite are employed, this increase is still greater and is less uniform over the whole piece. Where expanded perlite alone is employed as aggregate there is some decrease in volume, but the strength and fire resistance of the boards are still very good.

To show the undesirable results of providing foamed cells, another batch is prepared and made into board in the same manner, except that there are added 4 lbs. of sodium soap of Vinsol resin, 8 cubic feet, per 1000 square feet of ⅝ inch board, of the expanded perlite weighing 8 lbs. per cubic foot, and no glass strands. The finished board weighed only 2050 lbs. per 1000 square feet; the compressive strength of the slurry at the mixer was only 150 p. s. i. and the wall rating test, only 48 minutes. To meet the requirement for fire-resistant board set up by the A. S. T. M., the fire test rating in the wall furnace must be at least 60 minutes.

The boards made according to the process of this invention also withstand the hose stream test in excellent manner. In this test, a wall partition is made up comprised of 2" x 4" wood studs having wallboards made according to this invention applied to both edges of the studs. One face of the wall is then subjected to gas flames in accordance with A. S. T. M. Standard Method of Fire Tests of Building Construction and Materials A. S. T. M. Des. E119-50 disposed at 2 feet from each other over the entire face of the wall, for 30 minutes. At the end of this time the wall is removed from the flames and a standard fire hose is played on the surface at 30 lbs. pressure from a distance of 20 feet (A. S. T. M. Des. E119-50). The boards which had been exposed directly to the flames and partially calcined by the heat are broken away by the water stream but after one minute per 100 square feet of surface exposed no leakage or cracking is exhibited by the wallboards attached to the edges of the studs on the side not exposed to the flame and little charring is exhibited by the studs.

In this specification and the appended claims, percentages are by weight, based on the total dry weight of the gypsum core and exclusive of the weight of the paper liners of the boards, except as may be otherwise specifically described. Where amounts are shown in pounds, these are based on 1000 square feet of finished board. The compressive strength of the slurry at the mixer is measured by taking samples of the slurry after it leaves the mixer and just ahead of the forming rolls, casting into 2-inch cubes, drying and determining the compressive strength of the dried cubes, and calculating to lbs. per square inch. Screen sizes given herein are U. S. Standards, as shown on page 2797 of the Handbook of Chemistry and Physics, 32nd edition, 1950–1951, Chemical Rubber Publishing Co. As glass fibers there are to be included vitreous ceramic fibers having a softening point of at least 1400° F., and of the fiber sizes shown hereinabove. The invention has been described more specifically with respect to wallboard but it is to be understood that it is applicable also to lath or sheathing or other gypsum core boards.

Having now described the invention, what is claimed is:

1. A set, dense cementitious composition characterized by a fire-resistance rating of at least 60 minutes, which consists essentially of a set mass of interlaced gypsum crystals and in intimate admixture therewith from 1% to 5% expanded perlite having a bulk density of from 5 to 15 lbs. per cubic foot and of particle size substantially entirely less than 2.38 mm. diameter and of at least 149 microns diameter, from 0.2% to 0.5% of vitreous ceramic fibers having a length of from 0.5 to 3.0 inch and an average diameter of from 0.00015 to 0.0006 inch, said composition containing not over 0.5% organic fibrous material.

2. A composition as in claim 1 containing about 3% of expanded perlite having a bulk density of from 7 to 12 lbs. per cubic foot, said expanded perlite being of such particle size that at least 50% of the particles are between 1.19 mm. and 300 microns diameter.

3. A composition as in claim 1 wherein an amount, less than 50%, of said added amount of expanded perlite is substituted by unexpanded vermiculite of particular size at least 90% passing a No. 50 screen.

4. A cementitious composition capable of setting with water to form a cementitious mass of interlaced gypsum crystals, said cementitious mass being characterized by a fire-resistance rating of at least 60 minutes, which contains in intimate admixture from 1% to 5% expanded perlite having a bulk density of from 5 to 15 lbs. per cubic foot and of particle size substantially entirely less than 2.38 mm. diameter and of at least 149 microns diameter, from 0.2% to 0.5% of glass strands having a length of from 0.5 to 1.0 inch and an average diameter of from 0.0003 to 0.0006 inch, and the remainder consisting essentially of calcined gypsum, said composition being free of organic fibrous material.

5. A composition as in claim 4 containing about 3% of expanded perlite having a bulk density of from 7 to 12 lbs. per cubic foot.

6. A composition as in claim 4 containing about 0.3% of said glass strands.

7. A composition as in claim 4 wherein an amount, less than 50%, of said added amount of expanded perlite is substituted by unexpanded vermiculite of particle size at least 90% passing a No. 50 screen.

8. A wallboard having an average weight of from 2800 to 3000 lbs. per 1000 square feet and an average thickness of ⅝ inch and characterized by a fire-resistance rating of over 60 minutes which includes a dense, set cementitious composition consisting essentially of a set mass of interlaced gypsum crystals and in intimate admixture therewith from 1% to 5% expanded perlite having a bulk density of from 5 to 15 lbs. per cubic foot and of particle size substantially entirely less than 2.38 mm.

diameter and of at least 149 microns diameter, from 0.2% to 0.5% of glass strands having a length of from 0.5 to 1.0 inch and an average diameter of from 0.0003 to 0.0006 inch, said composition containing not over 0.5% organic fibrous material.

9. A wallboard as in claim 8 wherein an amount, less than 50°, of said added amount of expanded perlite is substituted by unexpanded vermiculite of particle size at least 90% passing a No. 50 screen.

10. A wallboard having an average weight of approximately 2950 lbs. per 1000 square feet and characterized by a fire-resistance rating of over 60 minutes, and containing a set cementitious core which contains about 0.4% of glass strands having an average diameter of from 0.0003 to 0.0006 inch and a length of from 0.05 to 1.0 inch, 1.6% of expanded perlite having a bulk density of from 7 to 12 lbs. per cubic foot and having a particle size substantially entirely less than 2.38 mm. and of at least 149 microns diameter, and the remainder consisting essentially of gypsum, said cementitious composition containing not over 0.5% organic fibrous material.

11. A wallboard as in claim 10 wherein at least 50% of the expanded perlite particles are between 1.19 mm. and 300 microns in diameter.

12. A dense cementitious composition characterized by a fire-resistance rating of at least 60 minutes which consists essentially of a set mass of interlaced gypsum crystals and an admixture therewith of about 1% of expanded perlite particles having a bulk density of about 12 lbs. per cu. ft. and less than 1% glass fibers having a length of a fraction of an inch and an average diameter of about .0004 inch.

13. A set-hardened fire resistant cementitious composition consisting essentially of a set mass of interlaced gypsum crystals and in admixture therewith of about 1% to about 3% of expanded perlite and less than about 1% of very fine glass fibers having a length of a fraction of an inch.

References Cited in the file of this patent

UNITED STATES PATENTS

| | | |
|---|---|---|
| 2,352,201 | Jacob | June 27, 1944 |
| 2,425,883 | Jackson | Aug. 19, 1947 |
| 2,501,699 | Stecker | Mar. 28, 1950 |
| 2,526,066 | Croce | Oct. 17, 1950 |

FOREIGN PATENTS

| | | |
|---|---|---|
| 654,367 | Great Britain | June 13, 1951 |

OTHER REFERENCES

Zoradi: Abstract of application Serial No. 664,682; published January 16, 1951, 642 O. G. 987.

Serial No. 264,072, Ephraim et al. (A. P. C.), published May 11, 1943.